Nov. 22, 1938.       W. C. DORR ET AL       2,137,646
INSTRUCTION DEVICE FOR TIME TELLING
Filed Jan. 19, 1937      2 Sheets-Sheet 1
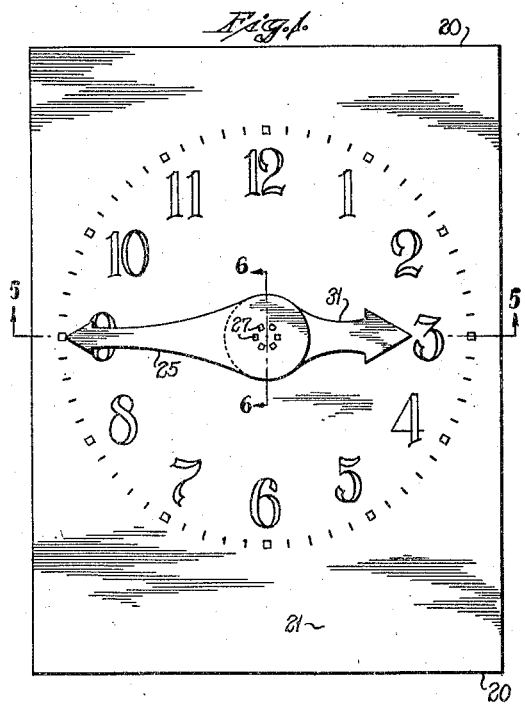
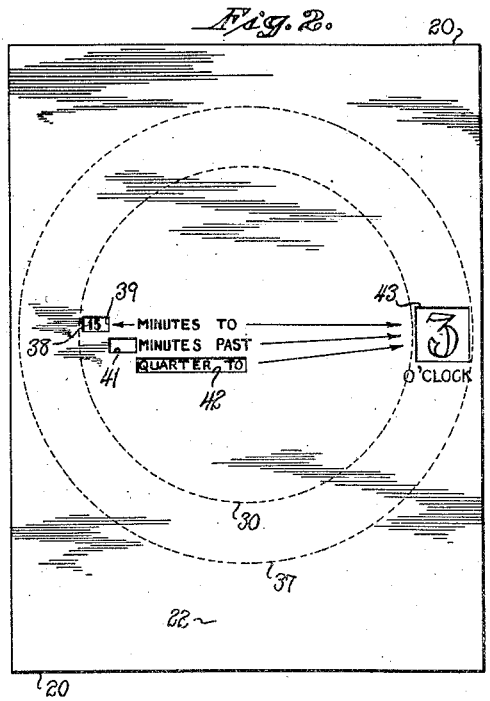
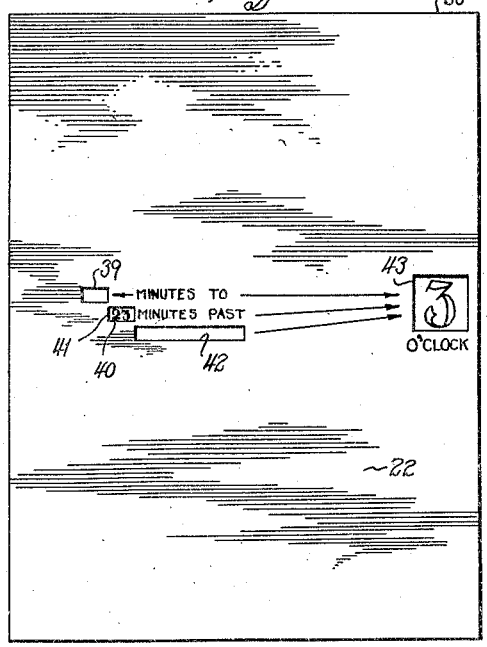
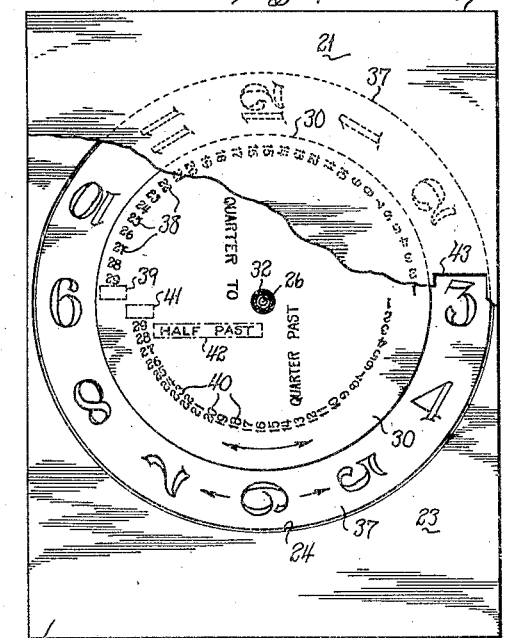

Nov. 22, 1938. W. C. DORR ET AL 2,137,646
INSTRUCTION DEVICE FOR TIME TELLING
Filed Jan. 19, 1937    2 Sheets-Sheet 2
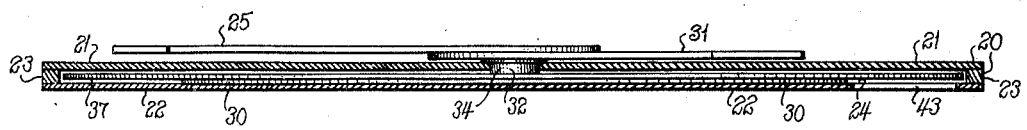
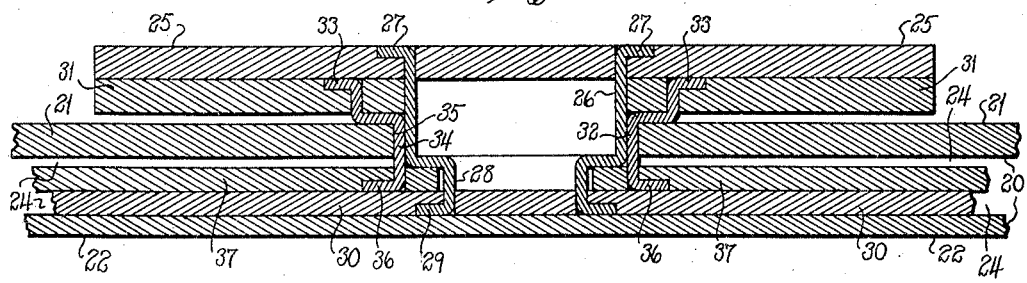
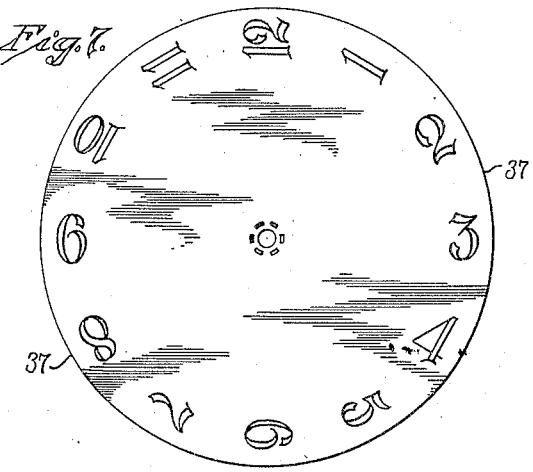
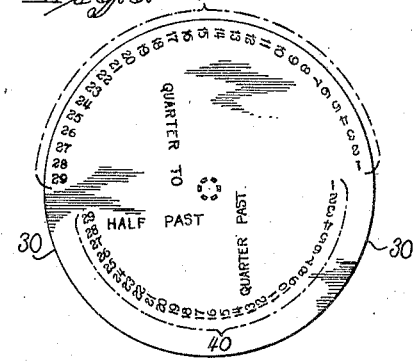
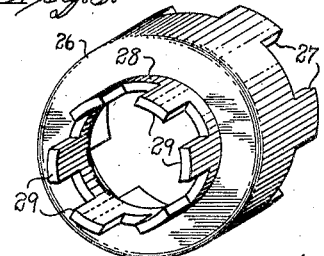
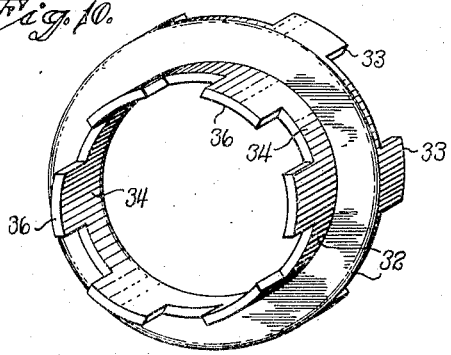
Inventors
William C. Dorr
James R. Putnam
By
Seymour Earle Nichols
Attorneys Patented Nov. 22, 1938

2,137,646

UNITED STATES PATENT OFFICE 2,137,646

INSTRUCTION DEVICE FOR TIME TELLING

William C. Dorr, Brooklyn, N. Y., and James R. Putnam, Waterbury, Conn., assignors to The Waterbury Clock Company, Waterbury, Conn., a corporation of Connecticut Application January 19, 1937, Serial No. 121,298

7 Claims. (Cl. 35—39)

This invention relates to an improvement in instruction devices and particularly to devices by means of which children may receive self-instruction in time-telling.

One of the objects of the present invention is to provide a superior device whereby children may be instructed in the art of correctly telling time.

A further object is to provide a superior instruction device whereby time-telling problems are automatically answered.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a view in front elevation of one form which an instruction device may assume in accordance with the present invention;

Fig. 2 is a view thereof in rear elevation;

Fig. 3 is a view corresponding to Fig. 2 but showing another setting of the device;

Fig. 4 is a similar view showing still another setting and with a portion of the back-plate broken away to expose the minute indicator-dial and the hour indicator-dial;

Fig. 5 is an enlarged-scale view in transverse section taken on the line 5—5 of Fig. 1;

Fig. 6 is a broken enlarged-scale detail sectional view taken on the line 6—6 of Fig. 1;

Fig. 7 is a detached face view of the hour indicator-dial;

Fig. 8 is a similar view of the minute indicator-dial;

Fig. 9 is a perspective view of the coupling-sleeve for the minute-indicator; and Fig. 10 is a similar view of the coupling-sleeve for the hour-indicator.

The particular embodiment of the present invention herein chosen for illustration comprises a hollow body-member generally designated by the numeral 20 and including a front-plate 21, a back-plate 22 and a spacing-plate 23 interposed between the two said plates 21 and 22 and serving to space the same apart to provide an interior chamber 24. The forward face of the described front-plate 21 is provided with hour numerals and minute calibrations in a manner similar to an ordinary clock dial.

Located forwardly of the front-plate 21 of the body-member is a minute-hand or pointer 25 which, for convenience of description, may be regarded as a "primary" time-indicator and which simulates in appearance the minute-hand of an ordinary timepiece. The said hand or pointer 25 is rigidly attached to the forward end of a tubular coupling-sleeve 26 which latter is provided on its forward edge with a series of coupling-fingers 27 which are bent over and pressed into the front face of the minute-hand 25.

The rear portion 28 of the coupling-sleeve 26 is of reduced diameter and is also provided with an annular series of coupling-fingers 29 which project rearwardly through and are bent over and into the rear face of a disk-like minute indicator-dial 30 which may be properly termed a "secondary" time-indicator. The said indicator-dial is located against the inner face of the rear plate 22 of the body-member 20, as clearly shown in Figs. 5 and 6.

From the foregoing it will be seen that the minute-hand (primary time-indicator) 25 and the minute indicator-dial (secondary time-indicator) 30 are coupled together for concurrent rotary movement so that as the said minute-hand 25 is rotated the minute indicator-dial 30 will also be rotated to a corresponding degree.

Intermediate the minute-hand 25 and the forward face of the front-plate 21 is an hour-hand or pointer 31 which is rigidly attached to the expanded forward portion of a coupling-sleeve 32 which is provided at its extreme forward end with an annular series of coupling-fingers 33 which are bent over and pressed into the forward face of the said hour-hand 31.

The contracted rear portion 34 of the coupling-sleeve 32 projects through and turns in a central aperture 35 formed in the front-plate 21, and in turn has bearing in it the coupling-sleeve 26 before referred to. The extreme rear end of the coupling-sleeve 32 is formed with an annular series of coupling-fingers 36 which extend through and are bent over and into the back-face of an hour indicator-dial 37 which is located directly intermediate the inner face of the front-plate 21 and the back of the minute indicator-dial 30.

From the foregoing, it will be seen that the hour-hand 31, which for purpose of description may be regarded as a "primary" time-indicator, is rigidly coupled for concurrent rotation with the hour indicator-dial 37, which latter may, like the minute indicator-dial 30 before referred to, be termed a "secondary" time-indicator.

The minute indicator-dial 30 bears upon its rear face a substantially-semicircular series 38 (from 1 to 29) of minute indications which are adapted to sequentially register with and be visible through a sight-opening 39 formed in the back-plate 22. The minute indicator-dial 30 also bears upon its rear face a second series 40 of minute indicia (running from 1 to 29) which are arranged on an arc of lesser diameter than the indicia 38 and which are adapted to sequentially register with and be visible through a second sight-opening 41 also formed in the back-plate 22 immediately adjacent the sight-opening 39 and located slightly inwardly with respect thereto, as clearly shown in Figs. 2 and 3.

The series 38 of minute indicia which sequentially show through the sight-opening 39 are to indicate "minutes to" various hours, and the series of minute indicia 40 visible through the sight-opening 41 are to indicate "minutes past", all as clearly marked upon the back-plate 22 adjacent the said openings and shown particularly well in Figs. 2 and 3.

The back-plate 22 is also formed with a relatively-long sight-opening 42 with which three quarter-hour indicia are adapted to sequentially register and be visible through. The said quarter-hour indicia are printed upon or otherwise carried on the back-face of the minute indicator-dial 30, as shown particularly well in Fig. 8, and respectively read "quarter past", "half past" and "quarter to".

The hour indicator-dial 37 has marked upon its rear face an annular series of numerals respectively representing each hour of a twelve-hour period and located so as to be outside of the edge of the minute indicator-dial 30 and to sequentially register with and be visible through a sight-opening 43 also formed in the back-plate 22.

The parts before described may be made of any suitable material, though it has been found that cardboard will serve for all of the parts save the coupling-sleeves 26 and 32, which latter may be made of brass, for instance.

By way of illustration of the use of the instruction device of the present invention, the hour-hand or primary hour-indicator 31 may be set to register with any one of the hour numerals appearing upon the forward face of the front-plate 21 of the device such, for instance, as the hour numeral 3, as shown in Fig. 1, and the minute-hand or primary minute-indicator may be also manually set as, for instance, to a position opposite the hand 31, also as indicated in Fig. 1.

As before pointed out, when the hour-hand or primary hour-indicator 31 is moved, the hour-dial or secondary hour-indicator 37 will be moved to a corresponding degree. Similarly, when the minute-pointer or primary minute-indicator 25 is moved, a corresponding movement of the complementary minute-dial or secondary minute-indicator 30 will be effected. Thus, after the pointers are set as indicated in Fig. 1, by reversing the device, it will be found that the secondary-indicators have been concurrently moved to occupy time-indicating positions bearing informative relationship to the time-indications of the primary-indicators, i. e., the numeral 15 of the series 38 of minute indicia will appear through the sight-opening 39 in the back plate 22, and also that the legend "quarter to" will appear through the sight-opening 42, and the hour numeral 3 on the back of the secondary hour-indicator or dial 37 will be in registration with the sight-opening 43, all as indicated in Fig. 2. Under the conditions just described, no numerals will appear through the sight-opening 41.

In Fig. 3 is represented a condition where the minute-pointer 25 has been moved to a position to indicate twenty-three minutes past the hour, under which circumstances the sight-openings 39 and 42 will have no indicia showing therethrough, while the sight-opening 41 will have registered therewith the numeral 23 of the series 40 of minute indicia on the dial 30.

In Fig. 4 is indicated a setting wherein no indicia would show through the sight-openings 39 and 41, but the legend "half past" on the dial 30 has been brought into registration with and would show through the sight-opening 42 in the back-plate 22.

From the foregoing, it will be seen that in the device herein chosen for illustration, the secondary time-indicators will show in plain terminology on the back of the device, the time of day to which the primary time-indicators 25 and 31 have been manually set. Thus, a child being instructed may speculate upon what time is indicated by the primary time-indicators 25 and 31, and then may ascertain the correct answer by reference to the time indicia showing through one or more of the various sight-openings 39, 41, 42 and 43.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. An instruction device of the class described, comprising: a plate-like body-member; a manually-rotatable primary minute-indicator carried by the said body-member for indicating minute-designating characters; primary hour-indicator also carried by the said body-member and manually rotatable independently of the said primary minute-indicator to indicate hour-designating characters; a rotary secondary minute-indicator of plate-like form carried by the said body-member and bearing minute-indicating indicia, the said secondary-indicator being operatively connected to the said primary minute-indicator; and a rotary secondary hour-indicator of plate-like form also carried by the said body-member and bearing hour-indicating indicia, the last-named secondary-indicator being operatively connected with the said primary hour-indicator; one of the said disk-like secondary indicators having a rim-portion projecting beyond the rim-portion of the other disk-like secondary indicator, and each of the said secondary-indicators being movable by and concurrently with its connected primary-indicator, whereby the secondary-indicators are movable to time-indicating positions bearing informative time-telling relationship to time-indications concurrently indicated by the said primary-indicators.

2. An instruction device of the class described, comprising: a plate-like body-member; a normally-stationary manually-rotatable minute-pointer carried by the said body-member for traversing minute-designating characters, and comprising a primary-indicator; a normally-stationary hour-pointer also carried by the said body-member and manually rotatable independently of the said minute-pointer to traverse hour-designating characters and comprising another primary-indicator; a rotary plate-like minute-dial comprising a secondary-indicator carried by the said plate-like body-member and bearing minute-indicating indicia, the said secondary-indicator being operatively connected to the said minute-pointer; and a rotary plate-like hour-dial bearing hour-designating indicia, the last-named secondary-indicator being also carried by the said body-member and operatively connected with the said hour-pointer, all of the said pointers and dials being substantially coaxial and extending in substantially parallel planes, and each of the said secondary-indicators being movable by and concurrently with its connected primary-indicator, whereby the secondary-indicators are movable to time-indicating positions bearing informative time-telling relationship to time-indications concurrently indicated by the said primary-indicators.

3. An instruction device of the class described, comprising: a plate-like body-member having at least two sight-openings therein; a manually-movable rotatable primary minute-indicator carried by the said body-member for indicating minute-designating characters; a primary hour-indicator also carried by the said body-member and manually-rotatable independently of the said primary minute-indicator to indicate hour-designating characters; a plate-like secondary minute-indicator operatively connected to the said primary minute-indicator and carrying a series of indicia sequentially registrable with one of the sight-openings in the said plate-like body-member; and a plate-like secondary hour-indicator operatively connected with the said primary hour-indicator and bearing a series of indicia sequentially registrable with the other of said sight-openings in the body-member, all of the four said indicators being substantially coaxial and extending in substantially paralel planes, and each of the said secondary-indicators being movable by and concurrently with its connected primary-indicator, whereby the secondary-indicators are movable to time-indicating positions bearing informative time-telling relationship to time-indications concurrently indicated by the said primary-indicators.

4. An instruction device of the class described, comprising: a plate-like body-member having at least two sight-openings therein; a normally-stationary manually-rotatable minute-pointer carried by the said body-member for traversing minute-designating characters, and comprising a primary-indicator; an hour-pointer also carried by the said body-member and manually rotatable independently of the said minute-pointer to traverse hour-designating characters and comprising another primary-indicator; a plate-like rotary minute-dial comprising a secondary-indicator operatively connected to the said minute-pointer and carrying a series of indicia sequentially registrable with one of the sight-openings in the said plate-like body-member; and an hour-dial bearing hour-designating indicia, the last-named secondary-indicator being operatively connected with the said hour-pointer and bearing a series of indicia sequentially registrable with the other of said sight-openings in the body-member, all of the said pointers and dials being substantially coaxial and extending in substantially parallel planes, and each of the said secondary-indicators being movable by and concurrently with its connected primary-indicator, whereby the secondary-indicators are movable to time-indicating positions bearing informative time-telling relationship to time-indications concurrently indicated by the said primary-indicators.

5. An instruction device of the class described, comprising: a plate-like body-member having at least two sight-openings in its back-face; a manually-rotatable primary minute-indicator positioned on the said body-member for indicating minute-designating characters adjacent the front-face thereof; a primary hour-indicator also located adjacent the front-face of the said body-member and manually-rotatable independently of the said primary minute-indicator to indicate hour-designating characters; a plate-like secondary minute-indicator operatively connected to the said primary minute-indicator and bearing a series of indicia sequentially registrable with one of the sight-openings in the back-face of the said plate-like body-member; and a plate-like secondary hour-indicator operatively connected to the said primary hour-indicator and bearing a series of indicia sequentially registrable with the other of the said sight-openings in the back-face of the said body-member, all of the four said indicators being substantially co-axial and extending in substantially parallel planes, and each of the said secondary-indicators being movable by and concurrently with its connected primary-indicator, whereby the secondary-indicators are movable to time-indicating positions bearing informative time-telling relationship to time-indications concurrently indicated by the said primary-indicators.

6. An instruction device of the class described, comprising: a plate-like body-member having at least two sight-openings in its back-face; a normally-stationary manually-movable rotatable minute-pointer positioned on the said body-member for traversing minute-designating characters, and comprising a primary-indicator adjacent the front-face thereof; a normally-stationary movable hour-pointer also located adjacent the front-face of the said plate-like body-member and manually-rotatable independently of the said minute-pointer to traverse hour-designating characters and comprising another primary-indicator; a plate-like minute-dial comprising a secondary-indicator operatively connected to the said minute-pointer and bearing a series of indicia sequentially registrable with one of the sight-openings in the back-face of the said plate-like body-member; and a plate-like hour-dial bearing hour-designating indicia, the last-named secondary-indicator being operatively connected to the said hour-pointer and bearing a series of indicia sequentially registrable with the other of the said sight-openings in the back-face of the said body-member, all of the said pointers and dials being substantially coaxial and extending in substantially parallel planes, and each of the said secondary-indicators being movable by and concurrently with its connected primary-indicator, whereby the secondary-indicators are movable to time-indicating positions bearing informative time-telling relationship to time-indications concurrently indicated by the said primary-indicators.

7. An instruction device of the class described, comprising: a plate-like body-member; a manually-rotatable primary minute-indicator carried by the said body-member for indicating minute-designating characters; a primary hour-indicator also carried by the said body-member and coaxially arranged with respect to the said primary minute-indicator and manually rotatable independently of the said primary minute-indicator to indicate hour-designating characters; a rotary secondary minute-indicator of plate-like form also carried by the said body-member and bearing minute-indicating indicia, the said secondary-indicator being operatively connected to the said primary minute-indicator and rotatable coaxially with respect to both the said primary minute-indicator and the said primary hour-indicator; and a rotary secondary hour-indicator of plate-like form carried by the said body-member and bearing hour-indicating indicia, the last-named secondary-indicator being operatively connected to the said primary hour-indicator and mounted for rotation coaxially with respect to all three of the aforesaid primary minute-indicator, primary hour-indicator and secondary minute-indicator, and each of the said secondary-indicators being movable by and concurrently with its connected primary-indicator, whereby the secondary-indicators are movable to time-indicating positions bearing informative time-telling relationship to time-indications concurrently indicated by the said primary-indicators.

WILLIAM C. DORR.
JAMES R. PUTNAM.